(12) United States Patent
Lunt et al.

(10) Patent No.: US 7,054,518 B2
(45) Date of Patent: May 30, 2006

(54) ETALON ASSEMBLY TUNED BY APPLYING COUNTERBALANCED COMPRESSION FORCES

(75) Inventors: Andrew G. Lunt, Sonoita, AZ (US); Manuel B. Serrano, Tucson, AZ (US); Yakov Sidorin, Tucson, AZ (US); David Lunt, Tucson, AZ (US)

(73) Assignee: Coronado Instruments, Inc., Irvine, CA (US)

( * ) Notice: Subject to any disclaimer, the term of this patent is extended or adjusted under 35 U.S.C. 154(b) by 83 days.

(21) Appl. No.: 10/795,167

(22) Filed: Mar. 5, 2004

(65) Prior Publication Data

US 2005/0078906 A1   Apr. 14, 2005

Related U.S. Application Data

(60) Provisional application No. 60/510,812, filed on Oct. 14, 2003.

(51) Int. Cl.
*G02B 6/26* (2006.01)
*H01S 3/10* (2006.01)

(52) U.S. Cl. .......................... 385/15; 385/13; 385/140; 372/20

(58) Field of Classification Search .................. 385/12, 385/13, 31, 25, 147, 15, 140; 250/227.11; 372/20, 92
See application file for complete search history.

(56) References Cited

U.S. PATENT DOCUMENTS

| | | | | |
|---|---|---|---|---|
| 5,068,861 A | * | 11/1991 | Abbott et al. | 372/20 |
| 5,124,994 A | * | 6/1992 | Leuchs et al. | 372/32 |
| 6,181,726 B1 | | 1/2001 | Lunt | 372/98 |
| 6,215,802 B1 | | 4/2001 | Lunt | 372/34 |
| 6,552,856 B1 | * | 4/2003 | Chen | 359/634 |
| 6,667,804 B1 | * | 12/2003 | Kleinschmidt | 356/326 |

* cited by examiner

*Primary Examiner*—Brian M. Healy
(74) *Attorney, Agent, or Firm*—Antonio R. Durando (57) ABSTRACT

A compressive force is applied to a conventional air-spaced etalon filter to fine tune the thickness of the spacers to a precise and uniform optical length. The etalon is coupled to a housing device capable of adjusting the thickness of each spacer, thereby tuning the etalon to the desired filter wavelength. The resulting assembly is permanently set to the desired parameters for direct use in optical applications.

18 Claims, 7 Drawing Sheets

ETALON ASSEMBLY TUNED BY APPLYING COUNTERBALANCED COMPRESSION FORCES

RELATED APPLICATIONS

This application is based on U.S. Provisional Ser. No. 60/510,812, filed Oct. 14, 2003.

BACKGROUND OF THE INVENTION

1. Field of the Invention

This invention pertains to the general field of optical filters and, in particular, to a novel approach for fine tuning high-performance etalon filters.

2. Description of the Prior Art

Figure 1:
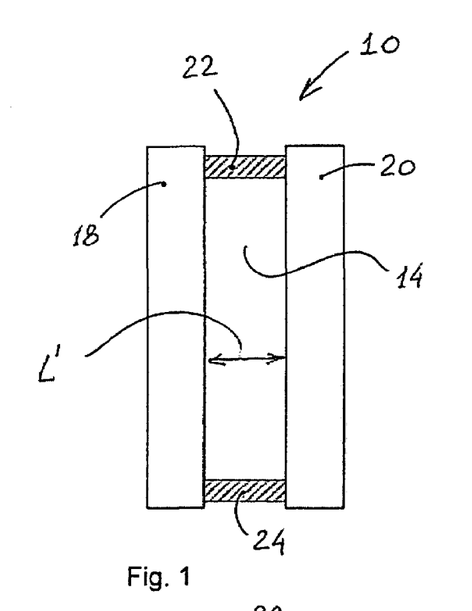
FIG. 1 illustrates schematically a conventional etalon.
Figures 2, 6:
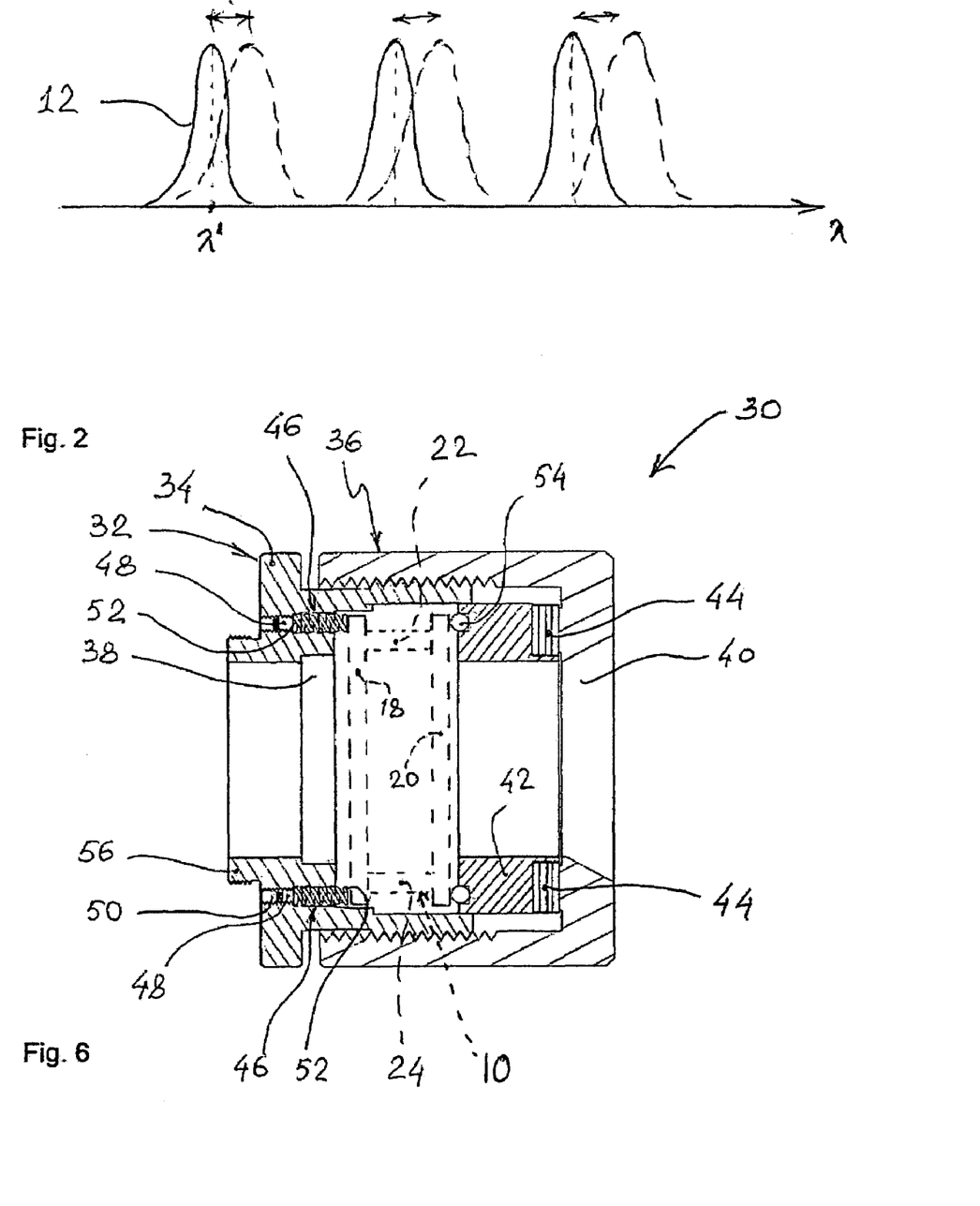
FIG. 2 is an illustration of a typical intensity-versus-wavelength spectrum of the transmission beam produced by an etalon.
FIG. 6 is a sectioned side-elevational view of a device for adjusting the parallelism and fine tuning the optical length of a conventional etalon according to the invention.

Etalons are well known optical devices that consist of two reflective surfaces parallel to one another and spaced apart by a predetermined optical length. They may consists simply of a solid parallel plate (so called "solid etalons") or of two plates with an air gap between them that defines a cavity (so called "air-spaced etalons"), as illustrated in FIG. 1. When illuminated with a broadband collimated light, etalons produce a transmission beam and a reflection beam with periodic spectra characterized by very narrowband spikes of wavelength determined by the physical properties and dimensions of the etalon. A typical etalon transmission spectrum is illustrated in FIG. 2. With reference to air-spaced etalons, in particular, the specific center wavelength □' of the passband (the spectral spike) and the period between spectral spikes (commonly referred to in the art as channel spacing or free spectral range, FSR, of the device) are a function of the optical length of the etalon's cavity.

In particular, referring for example to the etalon 10 and the intensity spectrum 12 of FIGS. 1 and 2, respectively, minor changes in the optical length L of the cavity 14 will cause a shift of the periodic spectrum along the wavelength axis, as indicated by arrows 16. As is well understood by those skilled in the art, varying the optical length of the cavity also produces a change in the free spectral range of the etalon.

These properties of etalons are very advantageous for many optical applications. In particular, etalons are used as high-performance filters to isolate light of a very a precise frequency, as may be needed for a particular application. In telescopic astronomy, for instance, such filters are particularly useful for observing objects at specific wavelengths. Since the exact wavelength of each peak is a function of the exact optical length L of the cavity, it has been most important in the art to build etalon filters with precise and uniform spacing between the two plates (18,20) constituting the etalon (FIG. 1). To that end, very precisely machined spacers 22,24 of equal thickness L' are used, typically uniformly distributed around the annular periphery of the plates in a sufficient number to separate the plates and produce a cavity of uniform optical length L. (It is noted that L' is the physical cavity length corresponding to the desired optical path length L, the two quantities being related by the equation $L=nL'$, where n is the index of refraction of the medium in the cavity.).

In practice it has been difficult and expensive to achieve the desired degree of perfection because of the very narrow tolerances (in the order of nanometers) required for the level of performance associated with astronomy applications. U.S. Pat. Nos. 6,181,726 and 6,215,802 disclosed several advances over the prior art whereby the uniformity of the etalon's optical length was improved. According to one approach described in the patents, all the spacers used to form the etalon are selected from a common local area of a spacer substrate produced by standard-precision optical manufacturing techniques. It was discovered that, as a result of this selection, the spacers tend to have substantially more uniform thickness and, therefore, they produce a more uniform etalon cavity. According to another, complementary approach, an additional spacer from the same local substrate area is used at the center of the etalon, thereby providing a correction to plane deformations produced by the optical contact of the peripheral spacers with the etalon plates.

While the techniques described in these patents provide a significant improvement over the etalons previously known in the art, they are very labor-intensive and therefore expensive to practice. In addition, the resulting etalons, while more uniform in the optical length of the cavity, are not necessarily tuned to the precise desired wavelength. Therefore, there is still a need for an extremely accurate and relatively inexpensive way of controlling the uniformity as well as the optical length of the etalon cavity. The present invention provides simple solutions to that end.

BRIEF SUMMARY OF THE INVENTION

This invention is based on the concept of applying a compressive force to a conventional air-spaced etalon in order to adjust the thickness of the spacers used to form the cavity and produce a cavity length of precise and uniform optical length. According to one aspect of the invention, such a conventional etalon is coupled to a housing device capable of adjusting the thickness of each spacer, thereby tuning the etalon to the desired filter wavelength. Thus, the resulting assembly is permanently set to the desired parameters for direct use in optical applications.

In the preferred embodiment of the invention, the device consists of a housing that includes a hollow cylindrical component and a cap that define an interior space adapted to receive a conventional air-spaced etalon. The cylindrical component and the cap are coupled by means of a very finely treaded connection which, through rotation of the cap, allows the axial adjustment of the length of the interior space and the corresponding uniform compression of the etalon to fine tune the optical length of its cavity. In addition, individual pressure actuators aligned axially with each spacer in the etalon are used to further tune the etalon and to provide uniformity to the cavity according to predetermined performance specifications. Longitudinal openings in the cylindrical component and the cap are used to transmit a test light beam through the assembly during the tuning operation. Thus, after tuning, the characteristics of the etalon are permanently set and the entire assembly may be used as a high-performance filter according to the invention.

According to another aspect of the invention, the separation of the two parallel plates of an air-spaced etalon is produced by the interaction between a plurality of resilient spacers of known elastic modulus within the cavity and a corresponding plurality of pressure actuators acting on one of the outer surfaces of the etalon's plates. Prior-art spacers consist of essentially rigid materials utilized as non-resilient structures, although it is understood that all materials exhibit some degree of resilience. Accordingly, the spacers of the invention consist either of a conventional material with a measurable resilience or a mechanism with a predetermined elastic modulus in the range of the desired optical length of the cavity. Such a mechanism could include, for example, a spring or a pneumatic cylinder urging apart the two plates of the etalon. A hydraulic cylinder exerting a constant pressure on the plates could be used in equivalent fashion. The outer pressure actuators are then used to counterbalance the force exerted by the resilient spacers and produce the desired degree of parallelism between the etalon plates and an optical cavity length adjusted to the desired spectral range and tuned to produce the desired filter wavelength.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

This invention is based on the general idea of fine tuning a conventional etalon using compressive forces and the interaction between inner spacers urging the etalon plates apart and outer pressure actuators counteracting the spacers to the degree necessary to set the optical length of the cavity to its optimal value to achieve the desired performance characteristics. In addition, the invention is based on the recognition that the process of providing a fine-tuning housing for the etalon and utilizing the resulting assembly directly in optical applications is a more economical approach to produce high-quality etalons than the process of spacer selection used in the prior art.

As used herein, the term "spacer" refers to any structural component that creates a separation between the optical surfaces of an etalon, whether or not the spacer is integral with another structure and whether or not it consists of a mechanism or a body of material. Similarly, "pressure actuator" is used to refer to any mechanism capable of exerting a force on at least one of the plates of the etalon that produces a compressive action on a spacer in the cavity of the etalon. "Optical surface" refers to either of the two reflective surfaces constituting the etalon of the invention. Finally, the term "resilient" is intended to cover any spacer material with sufficient elasticity to permit its compression within the range necessary to fine tune the wavelength characteristics of the etalon.

Figure 3:
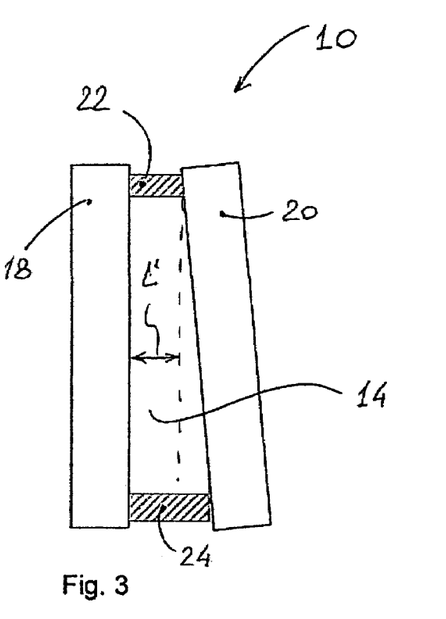
FIG. 3 is a schematic representation of a conventional etalon illustrating a sub-optimal cavity length and a misalignment between the plates of the etalon.
Figure 4:
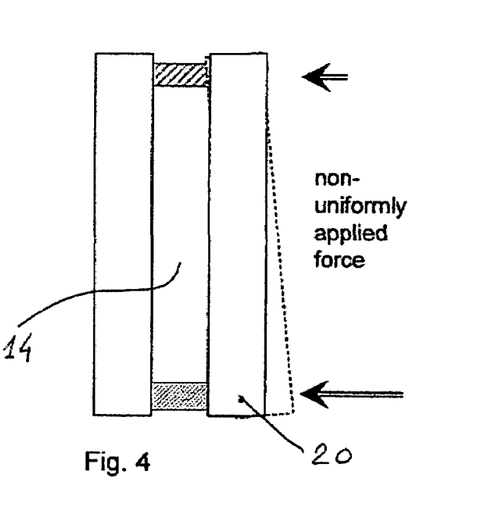
FIG. 4 is a schematic representation of a force component applied non-uniformly to the etalon of FIG. 3 to correct the parallelism of the plates that define the etalon cavity.
Figure 5:
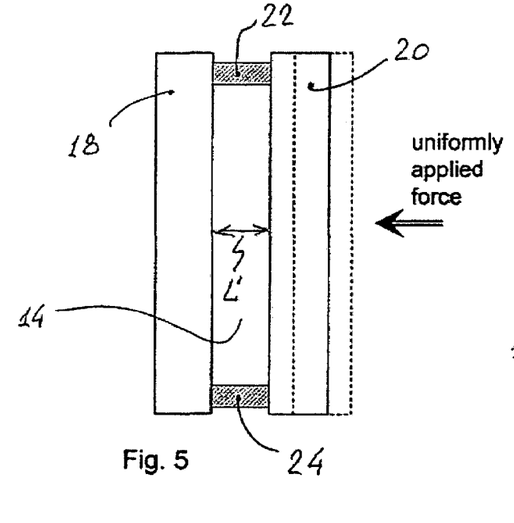
FIG. 5 is a schematic representation of a force component applied uniformly to the etalon of FIG. 3 to fine tune the optical path length of etalon cavity.

FIG. 3 illustrates in exaggerated fashion the misalignment and tuning challenges facing the usage of etalons as high-performance narrowband filters. Assuming that in order to achieve the desired performance the two plates 18,20 of the etalon 10 need to be perfectly parallel to one another and spaced apart by a distance L' (corresponding to the desired optical length L), the object of the invention is to provide the necessary compressive forces to produce that result. Thus, if the spacers 22,24 defining the cavity 14 (shown of unequal length) consist of conventional rigid material, such as fused silica, or of low thermal-expansion materials, such as glass or glass-ceramics (as sold, for example, by Corning Incorporated of Corning, N.Y., under the registered marks ULE and ZERODUR, respectively), sufficient force must be applied to the plates first to bring them into as-perfect-as-possible parallel relation and then to adjust their distance to L'. As illustrated in FIGS. 4 and 5, the compressive forces needed to achieve this result may thus be viewed as the combination of a non-uniform component acting to produce parallelism (FIG. 4) and a uniform component acting to fine tune the cavity length (FIG. 5). Accordingly, the invention provides an apparatus to perform these functions.

Figure 7:
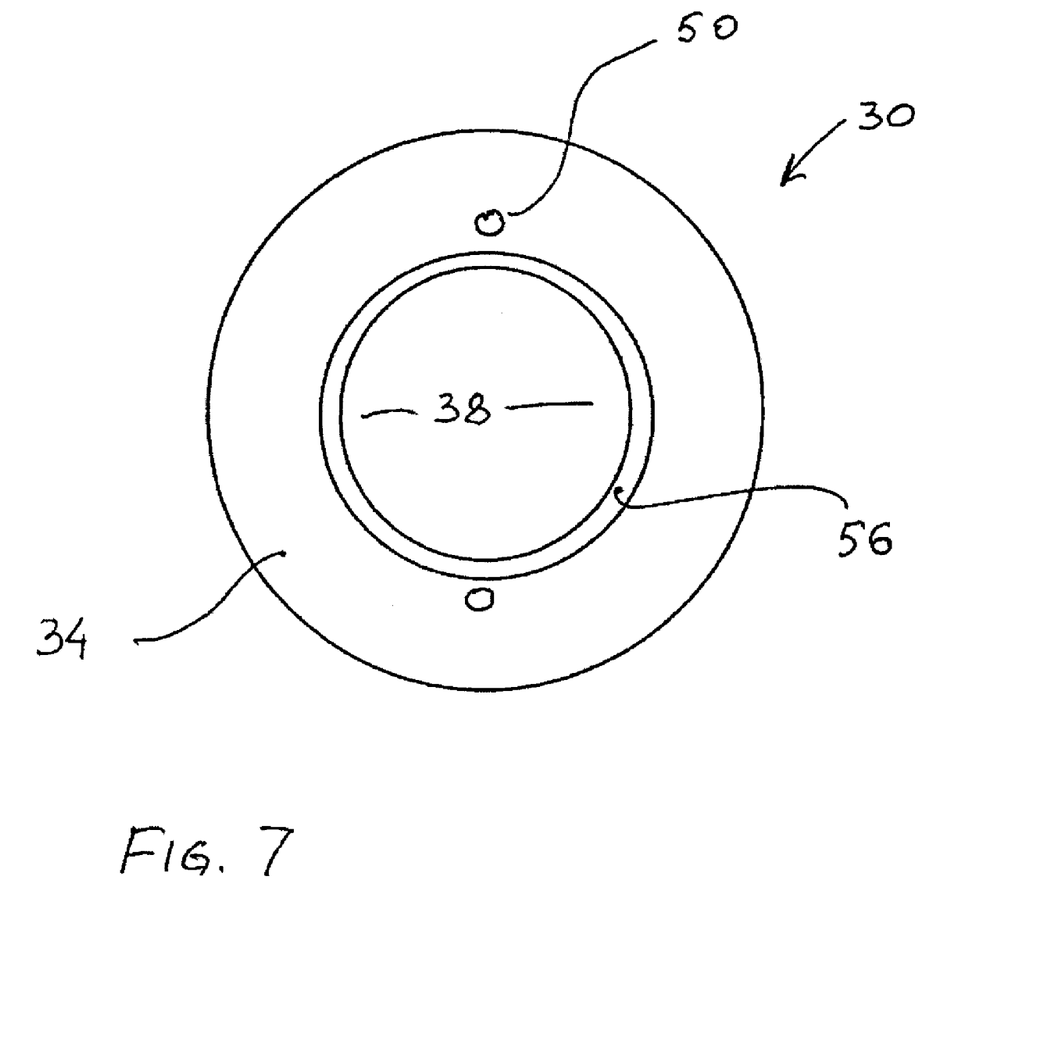
FIG. 7 is front-elevational view of the device of FIG. 6.
Figure 8:
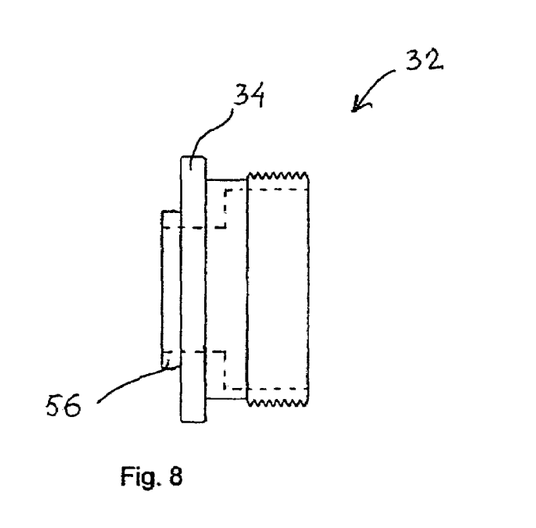
FIG. 8 is a side-elevational view of a hollow bolt-like cylindrical component for a device of the type illustrated in FIG. 6 adapted for use with an etalon having five spacers uniformly distributed around the longitudinal axis of the etalon.
Figure 9:
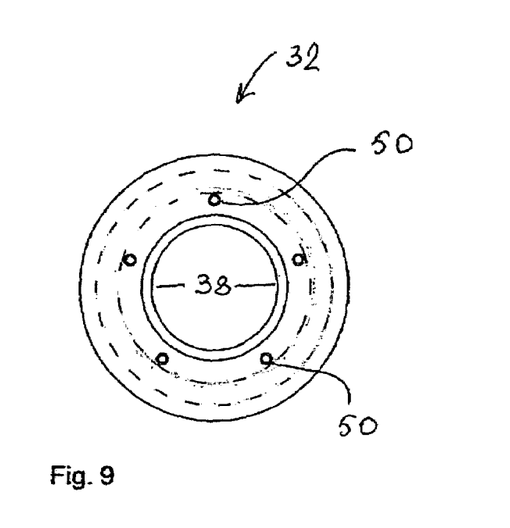
FIG. 9 is a front-elevational view of the component of FIG. 8.
Figure 10:
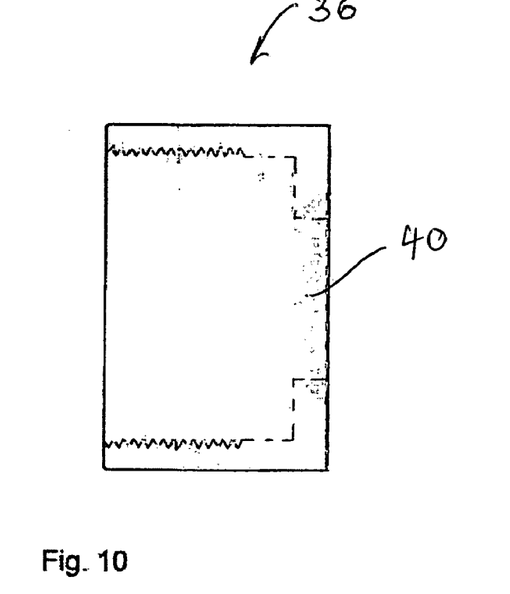
FIG. 10 is a side-elevational view of a hollow cap-like component adapted to mate with the cylinder of FIG. 8 as illustrated in the embodiment of FIG. 6.
Figure 11:
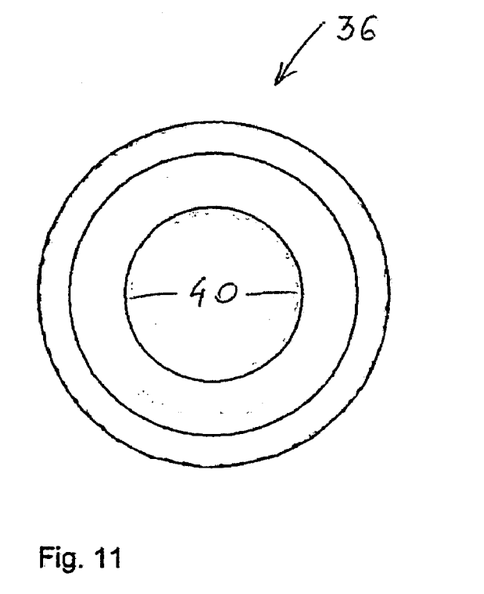
FIG. 11 is a front-elevational view of the cap component of FIG. 10.

FIG. 6 is a schematic sectioned side view of an etalon-tuning device 30 according to the invention. The device consists of two main components that define a hollow housing adapted to receive an etalon and impart the compressive forces required to tune it to the desired performance characteristics. The first component is a hollow bolt-like cylindrical structure 32 with a threaded outer surface and a flange-like head 34. The second component is a cap-like structure 36 rotatably connected to the cylindrical structure 32 through mating threads in its inner surface. As illustrated by the front view of FIG. 7, the flange 34 of the cylinder 32 has a frontal opening 38 and the cap 36 has a corresponding rear opening 40 to permit the longitudinal passage of a light beam though the assembly. The interior of the cylinder and cap 32,36 defines a space adapted to receive an etalon 10, as shown in phantom line in FIG. 6.

In order to exert compressive forces on the etalon, a cylindrical support 42 for the etalon is coupled to the inner side of the cap 36 by means of an annular bearing 44. The support 42 is used to exert pressure on one side of the etalon (plate 20). The bearing 44 allows the cap 36 to rotate freely around the support 42 independently of the pressure exerted on the etalon. The other side of the etalon (plate 18) is similarly supported by a plurality of pressure actuators 46 axially aligned with the spacers 22,24 of the etalon. Each pressure actuator 46 is independently adjustable to exert pressure on a corresponding etalon spacer to compress it and provide the necessary force to fine tune both the length and uniformity of the etalon cavity. In the embodiment of FIG. 6, each pressure actuator 46 consists simply of a screw 48 threadedly mounted into a respective bore 50 in the flange 34 of the cylinder 32 and urging a spring 52 against the plate 18 of the etalon.

Thus, the etalon 10 may be compressed by the action of two distinct forces. First, by rotating the cap 36 with respect to the cylinder 32, the length of the assembly is progressively reduced, which provides a uniform compressive force across the etalon. Obviously, very fine-slope threads are preferred to provide correspondingly fine and uniformly applied axial adjustments. Coarse-pitch threads are preferred because they provide greater thermal stability. A high-friction O-ring 54 is also preferably used on the side of the support 42 that faces the etalon to prevent the support from rotating with respect to the etalon when the cap 36 is being screwed onto the cylinder 32. Second, by adjusting the position of each screw 48 in the pressure mechanism 46, added pressure, that is not necessarily uniform across the etalon section, may be exerted on each spacer to fine tune its thickness and correspondingly the optical length and the uniformity of the etalon cavity. Only two spacers 22 and 24 are illustrated for simplicity in FIGS. 6 and 7, but it is clear that the process of tuning according to the invention is best accomplished with a number of pressure actuators 46 equal to the number of spacers in the etalon being tuned. Moreover, each pressure actuator is much preferably aligned axially with a corresponding spacer in order to optimally exert corrective pressure over it. It is also noted that the use of only two pressure actuators may create a potential instability in the adjustment mechanism. Therefore, in practice more than two are necessary to properly practice the invention. While two pressure opposed actuators, as shown in these figures, could theoretically suffice, three or more are believed to be necessary in order to overcome the potential instability problems associated with only two.

Figure 12:
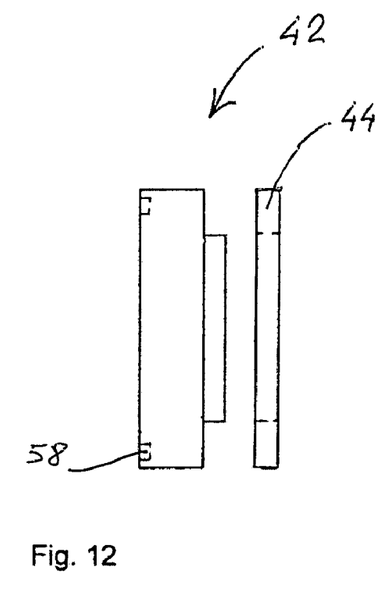
FIG. 12 is a side-elevational view of an internal etalon support, including the bearing shown in exploded view, rotatably coupled to the cap of FIG. 10 as illustrated in FIG. 6.
Figure 13:
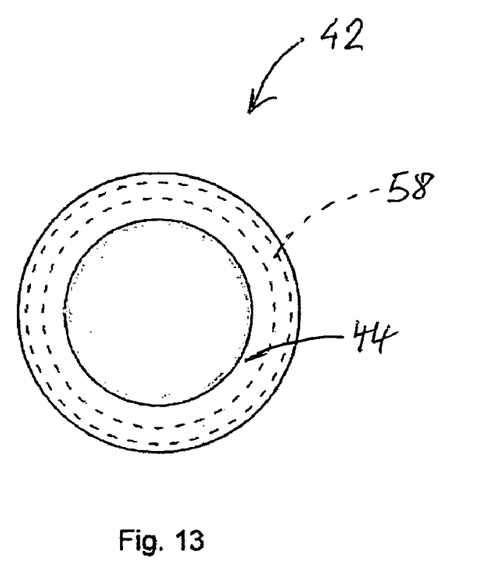
FIG. 13 is a rear-elevational view of the support of FIG. 12 without the bearing component.
Figure 14:
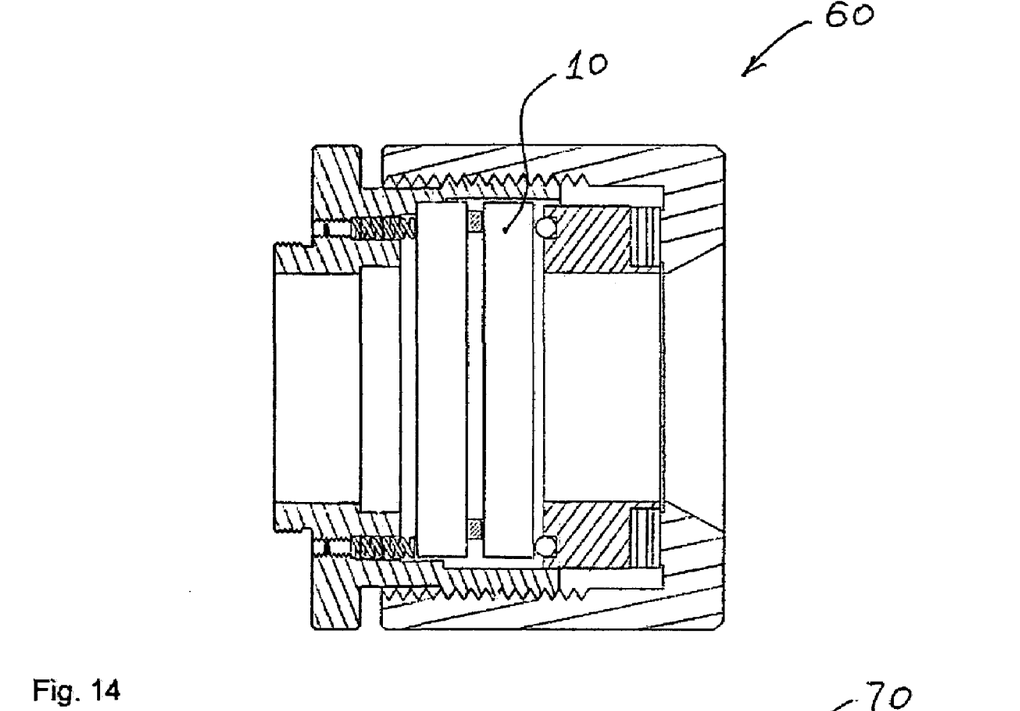
FIG. 14 is a schematic representation of a fine-tuned etalon assembly consisting of a conventional etalon tuned in the device of FIG. 6 according to the invention.
Figure 15:
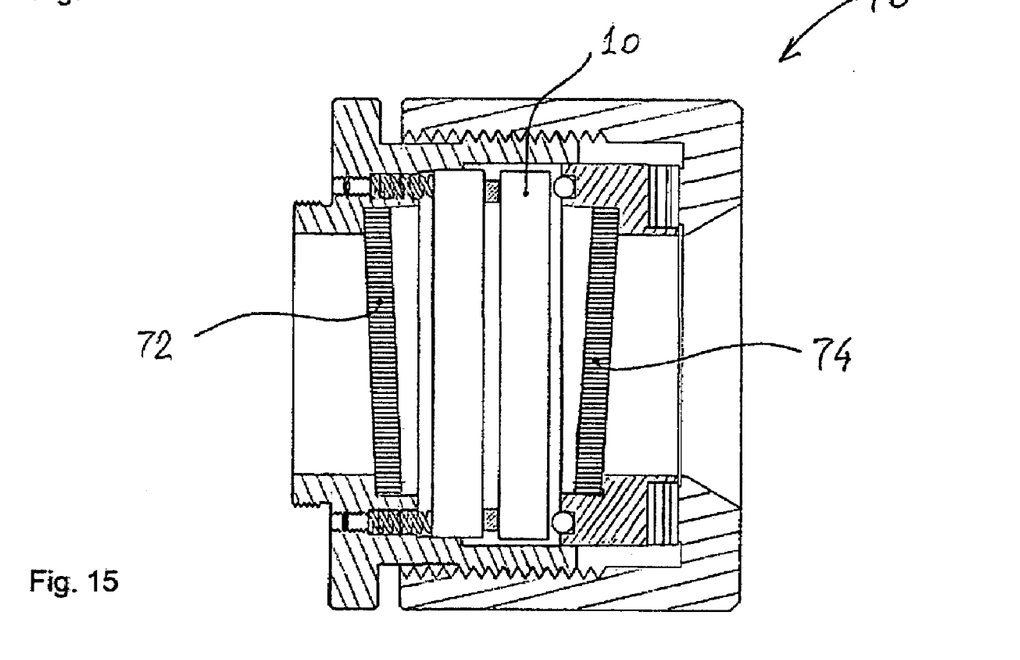
FIG. 15 illustrates the etalon assembly of FIG. 14 wherein additional optical elements are incorporated into the device to perform particular functions of interest.

FIGS. 8–13 show side elevational and front views of the cylinder 32, the cap 36, and the etalon support 42, including the bearing 44. This embodiment shows five uniformly spaced bores 50 (and corresponding pressure actuators 46, not seen in FIGS. 8 and 9) in the flange 34 of the cylinder 32 which may be used to fine tune an etalon with preferably five equally spaced-apart inner spacers. FIGS. 12 and 13 show the annular channel 58 used to retain the O-ring 54 in the etalon support 42. FIG. 14 illustrates schematically an etalon assembly 60 wherein a conventional etalon 10 is housed, fine-tuned according to predetermined performance specifications, and retained to provide an etalon device suitable for high-performance applications. A collar 56 may be used to couple the etalon assembly 60 to an optical train of interest. FIG. 15 illustrates an etalon assembly 70 wherein additional optical elements 72,74 are added to the optical path as needed to perform specific functions.

Thus, it is clear that the concept of the invention is based on the idea of balancing the interior action of the etalon spacers, which define the initial optical length of the etalon cavity, with the exterior action of pressure actuators urging an etalon plate (or both plates) against the spacers. In most general terms, this concept is illustrated schematically in the device 80 of FIG. 16, which shows an etalon constructed by combining two conventional plates urged apart by generic spacers 82 with counteracting pressure actuators 84. As detailed above, the exact cavity length and degree of plate parallelism of the etalon is determined by the respective force applied by each spacer 82 and each pressure actuator 84. By appropriately adjusting each spacer and pressure actuator, the device 80 can be fine tuned to the desired etalon performance characteristics. In practice, these adjustments are made while a collimated light is passed through the assembly and the center wavelength of the passband is monitored to fine tune it to the desired specification.

Figure 16:
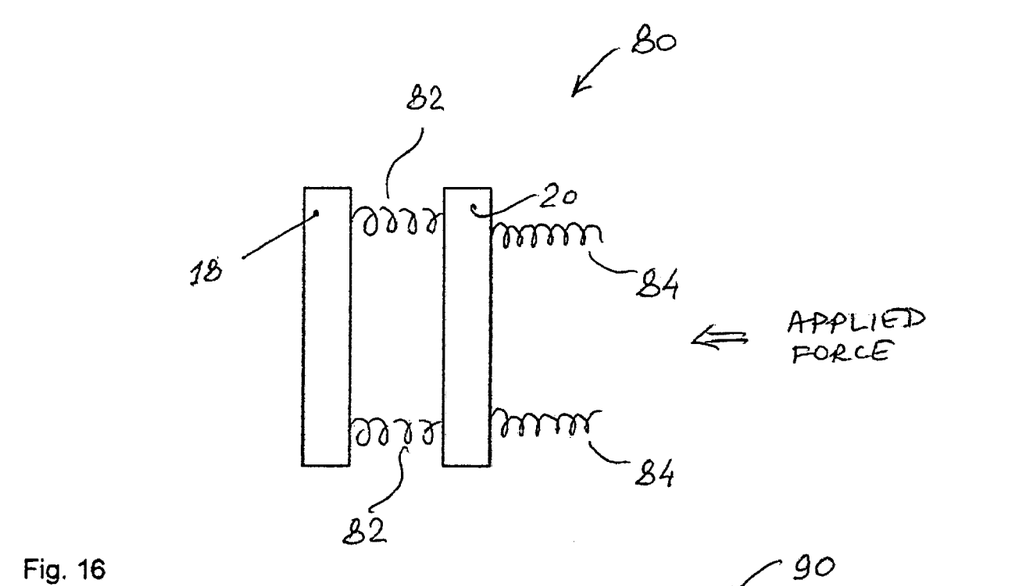
FIG. 16 is a schematic representation of the general concept of the present invention, illustrating an etalon including two conventional plates urged apart by generic inner spacers and counteracting outer pressure actuators to produce the exact cavity length and degree of plate parallelism required for a particular application.

It is understood that the invention could be practiced as described using any of form of spacer or pressure-actuator implementation. For instance, either element could consist of an adjustable spring unit, an adjustable pneumatic cylinder, or even a hydraulic cylinder. Similarly, either the spacer or the pressure actuator could consist of a hard resilient material, such as fused silica, counterbalanced by the other in the form of an adjustable device, such as enumerated above. In particular, it has been discovered that using spacers 82 made out of springs of predetermined mechanical characteristics, it is possible to vary significantly the cavity length to produce a desired free spectral range in a given order of interference. Thus, the spacers 82 between plates can be used to adjust the cavity length within a range that is orders of magnitude greater than previously possible to achieve the desired spectral range of operation. The pressure actuators 84 can then be used to fine tune the etalon to a precise wavelength.

Figure 17:
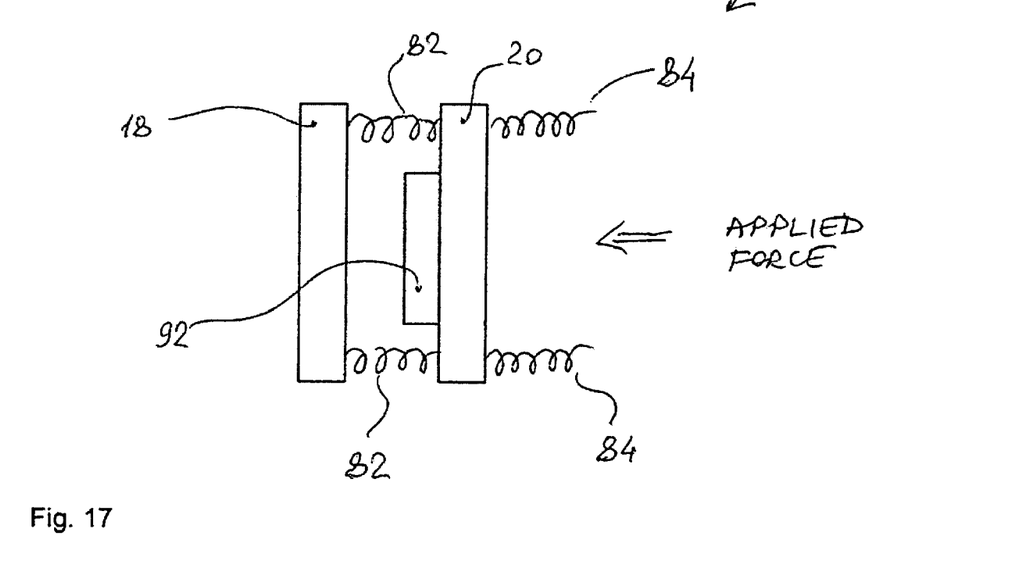
FIG. 17 is a schematic representation of the general concept of the invention with reference to re-entrant etalon.

As illustrated by these embodiments, the invention provides a simple and precise way to control the optical path length and the parallelism of an etalon cavity, and it may be implemented easily and at low cost of manufacture for use in any optical device. As would be clear to one skilled in the art, although the invention has been described in terms of a conventional air-spaced etalon, it could be applied in similar fashion to establish and fine tune the performance characteristics of any optical cavity. For example, FIG. 17 illustrates a device 90 wherein the concept of the invention is applied to a so-called "re-entrant" etalon, which includes a parallel riser 92. To the extent that a sufficiently compressible material were used, the invention could even be practiced to deform and fine tune the characteristics of the so-called "solid etalon" (which consists of two parallel surfaces on opposite sides of a single solid plate).

Therefore, it is clear that various changes in the details and steps that have been described may be made by those skilled in the art within the principles and scope of the invention herein illustrated and defined in the appended claims. For example, the etalon assemblies of the invention have been described as operating in transmission, requiring a longitudinal opening through the entire assembly, but one skilled in the art would readily understand that etalons can be used as filters with similar spectral characteristics operating in reflection, as well, in which case a single opening through the assembly would be sufficient. Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

What is claimed is:

1. An optical-cavity assembly having a predetermined optical path length, comprising:
    two optical surfaces disposed substantially in parallel to one another to define an optical cavity; and
    a plurality of variable means for adjusting a distance between the optical surfaces to produce said predetermined optical path length;
    wherein each of said variable means operates independently along a corresponding longitudinal axis by applying a variable force to vary said distance between said optical surfaces, and wherein said variable force is a resultant of two counteracting opposite forces urging at least one of said optical surfaces in opposite directions.

2. The assembly of claim 1, wherein each of said optical surfaces is a surface of an optical plate.

3. The assembly of claim 1, wherein each of said variable means includes a spacer urging the optical surfaces apart and a corresponding pressure actuator counteracting said spacer as required to produce said predetermined optical path length in the optical cavity.

4. The assembly of claim 2, wherein each of said variable means includes a spacer urging the optical plates apart and a corresponding pressure actuator counteracting said spacer as required to produce said predetermined optical path length in the optical cavity.

5. The assembly of claim 3, wherein said spacer urging the optical surfaces apart and said pressure actuator counteracting the spacer are axially aligned.

6. The assembly of claim 4, wherein said spacer urging the optical plates apart and said pressure actuator counteracting the spacer are axially aligned.

7. A method of fine tuning an optical cavity defined by two substantially parallel optical surfaces to produce a predetermined optical path length between said surfaces, comprising the, steps of:
    applying a separating force to the optical surfaces to produce a predetermined separation therebetween;
    applying a plurality of variable forces adapted to affect said predetermined separation by counteracting said separating force; and
    varying independently each of said variable forces along a corresponding longitudinal axis to a degree required to produce said predetermined optical path length uniformly between the optical surfaces, thereby obtaining a state of parallelism between the optical surfaces.

8. The method of claim 7, wherein each of said optical surfaces is a surface of an optical plate.

9. The method of claim 7, wherein the step of applying a separating force is carried out with a plurality of spacers urging the optical surfaces apart and the step of applying a plurality of variable forces is carried out with a plurality of pressure actuators independently counteracting said plurality of spacers as required to produce said predetermined optical path length uniformly between the optical surfaces.

10. The method of claim 8, wherein the step of applying a separating force is carried out with at a plurality of spacers urging the optical surfaces apart and the step of applying a plurality of variable forces is carried out with a plurality of pressure actuators independently counteracting said plurality of spacers as required to produce said predetermined optical path length uniformly between the optical surfaces.

11. The method of claim 9, wherein said plurality of spacers urging the optical surfaces apart and said plurality of pressure actuators counteracting the spacers are axially aligned.

12. The method of claim 10, wherein said plurality of spacers urging the optical surfaces apart and said plurality of pressure actuators counteracting the spacers are axially aligned.

13. A fine-tuned etalon assembly comprising:
    an etalon including two plates spaced apart by a plurality of spacers to define an etalon cavity;
    a housing for said etalon; and
    a plurality of pressure actuators, each adapted to exert independently a compressive force against a corresponding spacer to produce parallelism between the plates and to adjust an optical path length of said cavity to a predetermined specification.

14. The etalon assembly of claim 13, wherein said housing comprises a first component with a first interior surface adapted to butt against one of said parallel plates and a second component with a second interior surface adapted to butt against the other of said parallel plates, and mating threads rotatably coupling said first and second components such that a relative rotation therebetween produces a change in a distance between said first and second interior surfaces.

15. The etalon assembly of claim 13, wherein said plurality of pressure actuators and said plurality of spacers are axially aligned.

16. The etalon assembly of claim 14, wherein said second interior surface is included in an etalon support structure rotatably mounted inside said second hollow component such that said relative rotation between the first and second hollow components does not produce a corresponding rotation between said second interior surface and the other of said parallel plates.

17. The etalon assembly of claim 15, wherein said second interior surface is included in an etalon support structure rotatably mounted inside said second hollow component such that said relative rotation between the first and second hollow components does not produce a corresponding rotation between said second interior surface and the other of said parallel plates of the etalon.

18. The etalon assembly of claim 17, further including a friction element between said second interior surface and the other of said parallel plates of the etalon.

* * * * *

UNITED STATES PATENT AND TRADEMARK OFFICE
CERTIFICATE OF CORRECTION

| | | |
|---|---|---|
| PATENT NO. | : 7,054,518 B2 | Page 1 of 1 |
| APPLICATION NO. | : 10/795167 | |
| DATED | : May 30, 2006 | |
| INVENTOR(S) | : Andrew G. Lunt et al. | |

It is certified that error appears in the above-identified patent and that said Letters Patent is hereby corrected as shown below:

Column 8, line 5, delete the word "at".

Signed and Sealed this

Twelfth Day of December, 2006

JON W. DUDAS
*Director of the United States Patent and Trademark Office*